US009665181B2

(12) United States Patent
Morrison et al.

(10) Patent No.: US 9,665,181 B2
(45) Date of Patent: May 30, 2017

(54) INFORMATION HANDLING SYSTEM LOW HEIGHT ILLUMINATED KEYBOARD

(71) Applicant: Dell Products L.P., Round Rock, TX (US)

(72) Inventors: John T. Morrison, Round Rock, TX (US); Kevin M. Turchin, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 14/819,685

(22) Filed: Aug. 6, 2015

(65) Prior Publication Data

US 2017/0038855 A1    Feb. 9, 2017

(51) Int. Cl.
*G06F 3/02* (2006.01)
*H05B 33/08* (2006.01)

(52) U.S. Cl.
CPC ....... *G06F 3/0202* (2013.01); *H05B 33/0896* (2013.01)

(58) Field of Classification Search
CPC .............................. H04L 67/18; H04L 67/306
See application file for complete search history.

(56) References Cited

U.S. PATENT DOCUMENTS

2012/0097511 A1*  4/2012  Liu .................. H01H 3/125
                                                      200/5 A

* cited by examiner

*Primary Examiner* — David V Bruce
(74) *Attorney, Agent, or Firm* — Terrile, Cannatti, Chambers & Holland, LLP; Robert W. Holland

(57) ABSTRACT

An information handling system keyboard illuminates with light provided from an organic light-emitting diode (OLED) disposed as one or more films within the keyboard, such as proximate to or on a magnet biasing element used in a low profile keyboard. The OLED is powered with current provided through a keyboard membrane, such as with power connectors exposed on the membrane that have OLED films placed on them.

16 Claims, 8 Drawing Sheets

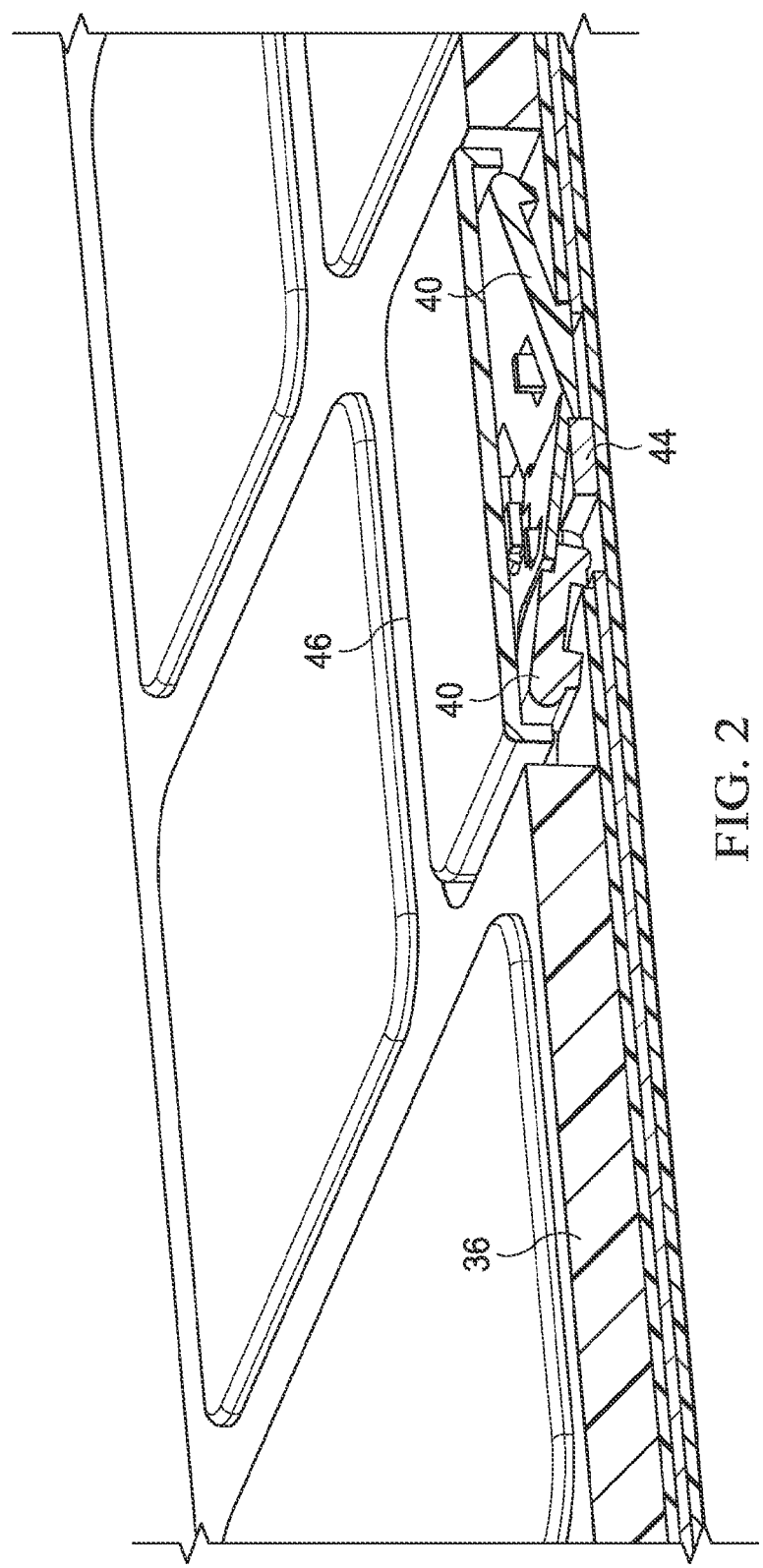

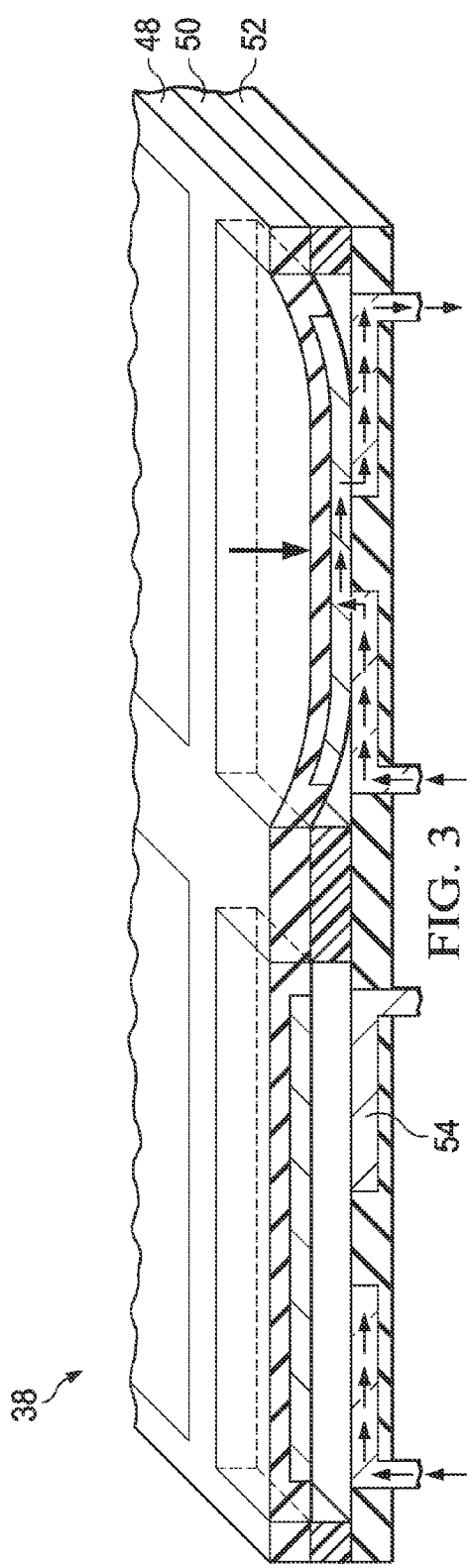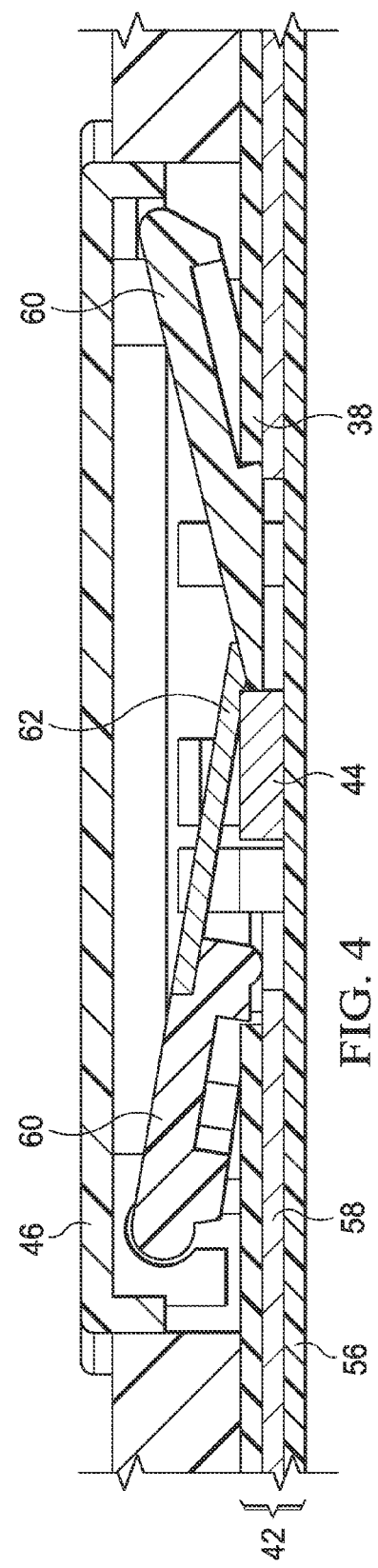

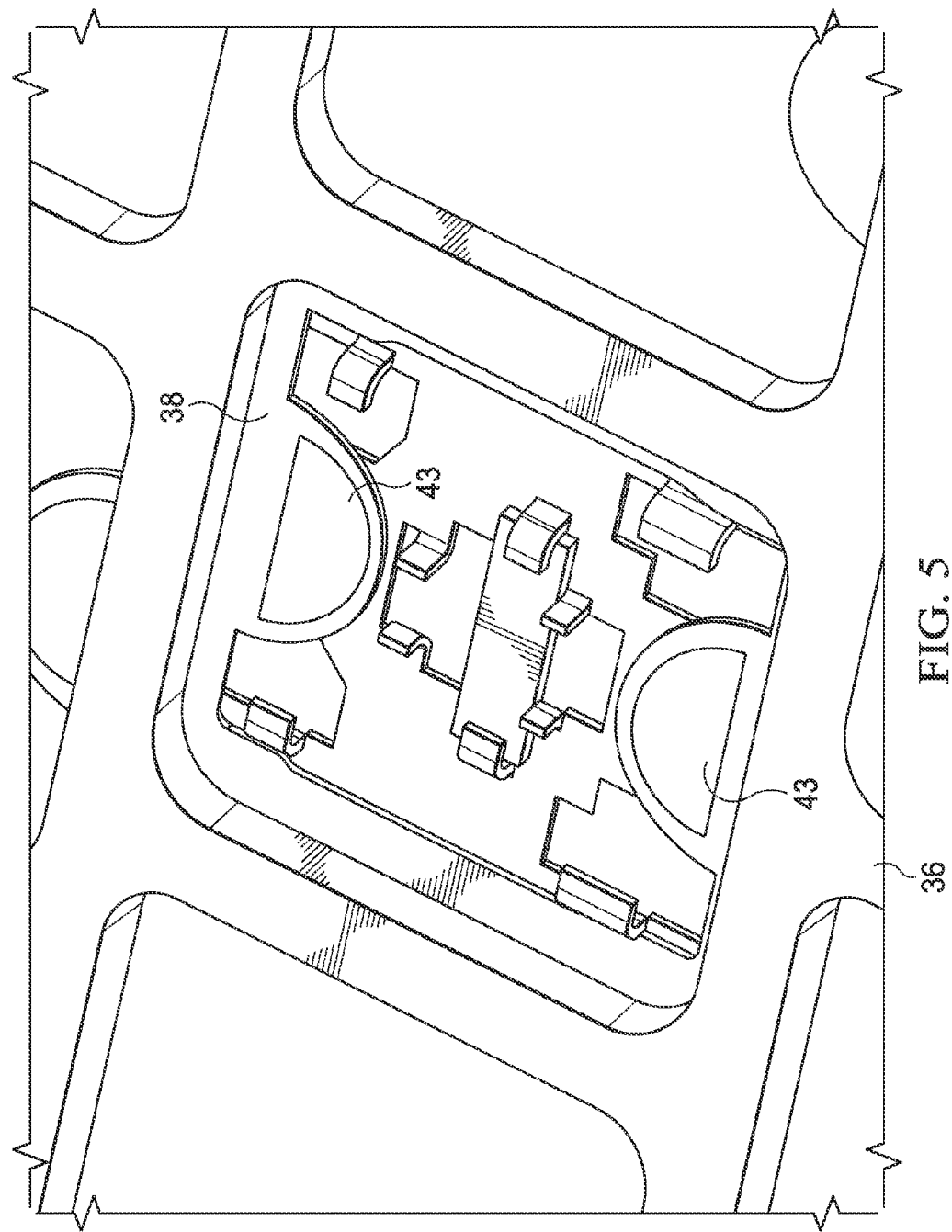

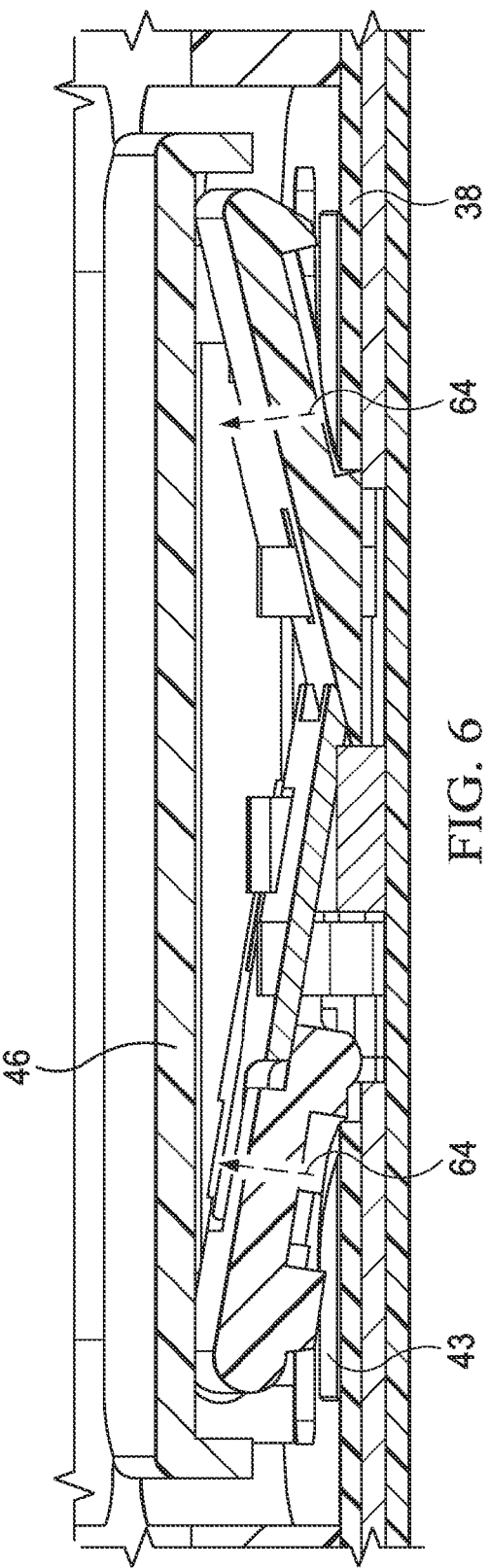

INFORMATION HANDLING SYSTEM LOW HEIGHT ILLUMINATED KEYBOARD

BACKGROUND OF THE INVENTION

Field of the Invention

The present invention relates in general to the field of portable information handling systems, and more particularly to an information handling system low height illuminated keyboard.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems typically include integrated input/output (I/O) devices and a battery to support operations untethered from peripherals and external power. Smaller portable devices often have a planar housing with one side populated by a touchscreen display so that end users can make inputs and view outputs without using a keyboard. Smartphone and tablet information handling systems are examples of systems that do not include physical keyboards, although smartphone and tablet information handling systems do often support interactions with peripheral keyboards through USB cables or wireless personal area networks (WPANs) such as Bluetooth. An advantage of the planar footprint and lack of a physical keyboard is that the thin height—also known as Z factor—allows users to conveniently store a phone or tablet in a purse or pants pocket. A disadvantage is that the touchscreen display keyboard tends to be difficult to use due to its small size and lack of physical input feedback. Typically end users prefer information handling system devices with physical keyboards when doing tasks that call for extended inputs, such as word processing or email tasks. When using a smartphone or tablet device with a peripheral keyboard, users effectively sacrifice some portability since the peripheral device increases the overall size of what the user must carry. Often, the peripheral keyboards come with a carrying case that holds the smartphone or tablet.

End users who tend to perform functions that use more typing, such as word processing, tend to prefer portable information handling systems that have integrated keyboards for more rapid inputs. Generally, portable information handling systems with integrated keyboards have a larger footprint with a clamshell or convertible form factor that provides room for more power processing components than those typically found in tablet systems. On the one hand, the more powerful processing components provide an enriched end user experience that provides support for a greater number of applications to execute. On the other hand, the more powerful processing components tend to use more power and generate more heat so that a larger battery and a cooling fan are generally included. Generally, the selection of the processing components, battery and cooling fan are driven by the size of the display integrated in the portable information handling system. Since the display and main housing tend to have the same X and Y size definitions, larger displays tend to have housings with greater internal space that supports more processing, power and cooling capabilities. End users typically understand that portability and display size are a tradeoff, however, end users who are used to the thin Z height of tablet information handling systems do desire to have clamshell and convertible systems with a reduced Z height if possible.

In order to reduce the Z height of information handling systems in general, manufacturers tend to use thin battery packs and tightly constrained motherboard configurations. These considerations help reduce the thickness of the main housing for systems that integrate a keyboard and the thickness of the planar housing of tablet systems. Portable information handling systems that integrate a keyboard tend to have physical constraints that limit size reductions available in Z height due to the room used by keys to travel vertically. End users tend to expect at least some minimal amount of movement, and the guided travel of a key tends to call for at least some structure in the keyboard that adds to Z height. Conventional keyboards tend to use a rubber dome that maintains a desired return pressure for the end user. Where Z height is a concern for end users, structures that have less key movement and different return forces may be used. For example, magnets disposed between keys and a support surface provide key movement with a thinner structure that helps reduce keyboard thickness. One feature sought in portable information handling system keyboards is illumination of the keys. When working in environments that have restricted light, users rely on illumination from behind the keys in order to see which keys are being pressed. LEDs or other light sources used to illuminate behind the keyboard tend to add some height.

SUMMARY OF THE INVENTION

Therefore a need has arisen for a system and method which provides an information handling system low height keyboard illumination.

In accordance with the present invention, a system and method are provided which substantially reduce the disadvantages and problems associated with previous methods and systems for illuminating an information handling system keyboard. Organic light-emitting diode (OLED) film disposed in a keyboard structure and powered from the keyboard membrane illuminates keyboard keys with minimal impact keyboard height.

More specifically, an information handling system interfaces with a keyboard to accept key inputs, such as with an integrated keyboard coupled through an internal bus or through a peripheral keyboard interfaced though a cable or wireless network. The keyboard includes plural keys, each key having a key cap supported on a lever structure that bias the key upwards away from a bottom support surface. In one embodiment, a magnet located under each key pulls a metal portion of the lever structure downward to bias the key upwards. A membrane disposed over the bottom support surface detects key inputs and sends a signal corresponding to key inputs from the key location to the information handling system. The membrane includes power wirelines to each key of the keyboard to selectively power an OLED film that provides backlight for the keys. The OLED film is deposited directly on the membrane, on the lever structure, on the magnet, on the bottom support and/or on the key cap with power routed to the OLED film from the membrane through the keyboard structure as necessary. Clear portions of the keyboard structure aid transmission of the light to the key cap.

The present invention provides a number of important technical advantages. One example of an important technical advantage is that keyboard illumination is provided with minimal impact on the height of the keyboard. OLED devices are integrated in the flexible printed circuit board used as the keyboard membrane so that additional structures to support keyboard illumination that would add height are minimized or avoided. Improved illumination is more precisely guided to the keys with light guiding structures integrated in the mechanical structure for each key. More precise illumination reduces power consumption from generation of excess non-directed light and provides a more pleasing user experience with the keyboard keys more precisely illuminated so that less spill over illumination decreases the contrast of the keys relative to ambient light and throws off ambient light correction of a display disposed over or otherwise proximate the keyboard.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 2 depicts a side perspective cutaway view of a keyboard having a low Z height with actuation supported by a magnet;

FIG. 3 depicts an upper perspective view of actuation of a keyboard input to provide an input signal;

FIG. 4 depicts a side cutaway view of a keyboard key configured to provide key illumination with an integrated OLED light source;

FIG. 5 depicts an upper perspective view of a membrane having an OLED film disposed proximate a key for illumination;

FIG. 6 depicts a side cutaway view of a key having OLED illumination provided through a transparent lever arm;

DETAILED DESCRIPTION

OLED film disposed within an information handling system keyboard structure provides back light to illuminate keys with power provided for the film through the keyboard membrane. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
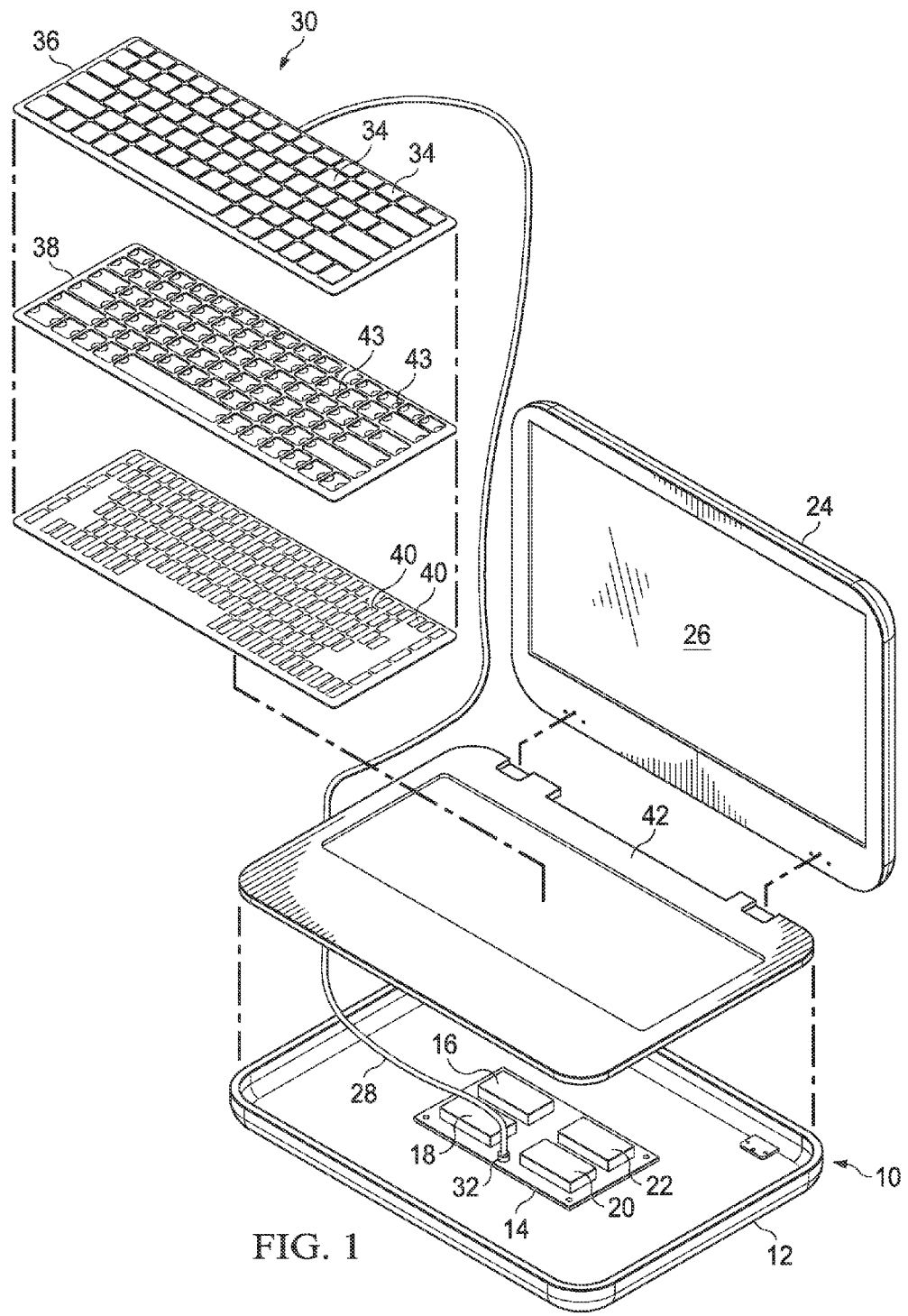
FIG. 1 depicts a blown up view of a portable information handling system having a keyboard illumination with an OLED film.

Referring now to FIG. 1, a blown up view depicts a portable information handling system 10 having a keyboard illumination with an OLED film. Portable information handling system 10 has a main chassis 12 that supports a motherboard 14 and processing components that process information, such as a central processing unit (CPU) 16, random access memory (RAM) 18, hard disk drive (HDD) 20 and keyboard controller 22. Main chassis 12 couples to a lid 24 that supports a display 26 for presenting information provided from the processing components as visual information. A keyboard cable 28 interfaces the processing components with a keyboard 30 that installs over main chassis 12 to cover motherboard 14. For example, inputs made at keyboard 30 are communicated through keyboard cable 28 to keyboard controller 22 for use by CPU 16. In the depicted example embodiment, lid 24 rotates about main chassis 12 between open and closed positions; in alternative embodiments, lid 24 may have a tablet with processing components disposed in it instead of in main chassis 12, or other types of configurations in which a tablet removeably couples to a keyboard or interfaces with a keyboard through a peripheral cable or wireless interface.

Keyboard 30 is depicted in an exploded view to illustrated the various locations within the keyboard structure where key backlight illumination may be added with OLED material 43, such as an OLED film that is selectively powered with current provided through keyboard cable 28 under the control of keyboard controller 22. Keys 34 extend out of an upper surface 36 to provide a user with selectable inputs to based upon the characters associated with the keys, such as a QWERTY keyboard that provides ASCI binary code inputs to keyboard controller 22. A membrane 38 disposed beneath keys 34 detect key inputs and generate a signal unique to each key for communication to keyboard cable 28. Membrane 38 is, for example, a flexible printed circuit board with wirelines that feed to cable 28 so that key inputs may be uniquely identified. Lever structures 40 are disposed below keys 34 to bias keys 34 in an upwards direction. End users make inputs by pressing on keys 34 to overcome the bias of lever structures 40 and impact membrane 38. A bottom support structure 42 provides support to maintain keys 34, membrane 38 and lever structures 40 in relative positions.

Those of skill in the art will appreciate that keyboard 30 may have a variety of structures for placement of keys 34 as individual caps or assembled as one part, for membrane 38 and for lever structures 40 to bias keys 34, such as springs or other types of devices that act to bias keys 34 upwards and away from membrane 38. In some example embodiments, keyboards include capacitive touch or other types of inputs that detect key presses with or without physical movement of keys 34. The example embodiment of FIG. 1 is provided to depict that OLED material 43 may be disposed at various locations of keyboard 30's structure in order to obtain desired illumination at keys 34. For example, OLED material is deposited as a film directly on electrical contacts of membrane 38 so that keyboard controller 22 may selectively illuminate the OLED material 43 by applying current. Alternatively, OLED material 43 is provided on bottom support surface 42, lever structures 40 and/or keys 34 with current routed to the OLED material from membrane 38 through the keyboard structure.

Referring now to FIG. 2, a side perspective cutaway view depicts a keyboard 30 having a low Z height with actuation supported by a magnet 44. A key cap 46 rests in an opening of an upper surface with room to move vertically in response to a press by an end user. Lever structure 40 has a metal center portion pulled downward by magnet 44 so the lever arms bias up key cap 46. When key cap 46 presses downward, the metal central portion of lever structure 40 is leverage upwards by the lever structure 40 arms and an input is translated to the membrane adjacent magnet 44.

Referring now to FIG. 3, an upper perspective view depicts actuation of a keyboard input to provide an input signal. Top membrane portion 48 is pressed downward in response to the key press through a hole layer 50 to press against a bottom membrane layer 52. Contact between top membrane layer 48 and bottom membrane layer 52 closes a circuit as depicted so that current flows to the keyboard controller to indicate an input. The present invention provides power to illuminate OLED films deposited on the top layer, bottom layer or in the hole layer by selectively providing current flow between the top and bottom layers that passes through the OLED film. For example, a FET or MUX closes the circuit based upon a command from the keyboard controller so that current flow is established.

Referring now to FIG. 4, a side cutaway view depicts a keyboard key configured to provide key illumination with an integrated OLED light source. Magnet support material 56 supports magnet 44 in hole layer 50 underneath a metal lever arm 62. Magnet 44 pulls down on metal lever arm 62 to leverage clear polycarbonate arms 60 upwards so that key cap 46 is biased upwards. On a downward push against key cap 46, clear arms 60 press down on membrane 38 backed by a metal plate 58 to generate an input signal. OLED films may be deposited at various locations within the keyboard structure to generate light in a desired manner. For example, an OLED film deposited directly on membrane 38 receives power for illumination from wirelines exposed on membrane 38 that have current selectively enabled under the management of the keyboard controller. Illumination to key cap 46 is guided through transparent material of polycarbonate arm 60. Alternatively, OLED film is deposited on lever structure 40, the underside of key cap 46, metal plate 58 and/or magnet 44. Current to illuminate the OLED film is forwarded to the deposited films from membrane 38 through the keyboard structure as necessary.

Referring now to FIG. 5, an upper perspective view depicts a membrane 38 having an OLED film 43 disposed proximate a key for illumination. OLED film 43 is deposited directly onto membrane 38 and over exposed wirelines so that current is provided from membrane 38 through OLED material 43 when turned on by the keyboard controller. In the depicted embodiment, membrane 38 has material added in locations where light illumination is desired. OLED film 43 adds minimal thickness and power consumption to membrane 38 so that key backlight illumination is provided without increasing keyboard height.

Referring now to FIG. 6, a side cutaway view depicts a key having OLED illumination provided through a transparent lever arm 60. Power applied from membrane 38 causes illumination upwards along light path 64 through lever arm 60 and towards key cap 46. In the example embodiment, illumination is provided from opposing sides of the key structure for more even key illumination. Key cap 46 may have a transparent or translucent material to pass light, or may have the character represented by the key left transparent for improved clarity by an end user. In one embodiment, OLED material is deposited on the bottom of key cap 46 to illuminate a character formed by transparent material or printed with the OLED material. Current to illuminate the OLED material is provided from membrane 38 and routed through wirelines embedded in key cap 46 or other conductive material printed over the bottom surface of key cap 46 to establish an electrical contact with membrane 38.

Figure 7:
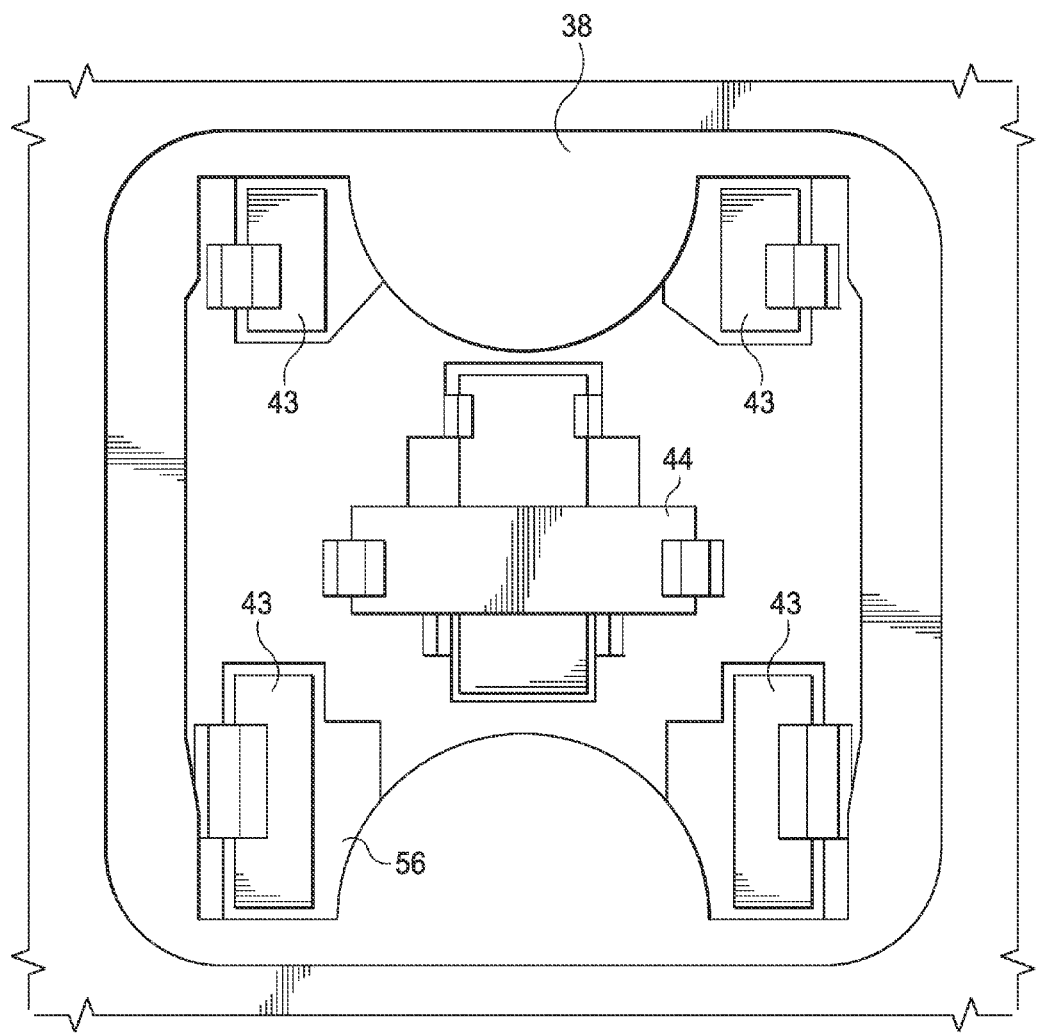
FIG. 7 depicts an upper view of an OLED film disposed on a keyboard support and powered from the keyboard membrane.

Referring now to FIG. 7, an upper view depicts an OLED film 43 disposed on a keyboard support 58 and powered from the keyboard membrane 38. In the example embodiment, OLED material is provided on both keyboard support 58 and magnet support 56 in the membrane 30 opening so that illumination is provided through the central portion of key cap 46. Placing the OLED material on the support surfaces provides an additional avenue for providing power to illuminate the OLED material instead of through membrane 38. For instance power wirelines may be routed on or under the supporting surfaces. OLED material is placed to provide a general and more even illumination that flows upwards towards key cap 46. In one embodiment, the amount of illumination is varied by changing the current provided to the OLED material or by changing which portions of OLED material is powered. In another embodiment, brightness is set by the thickness of OLED material. In the example embodiment of FIG. 7, illumination is provided with OLED film deposited beneath magnet 44.

Figure 8:
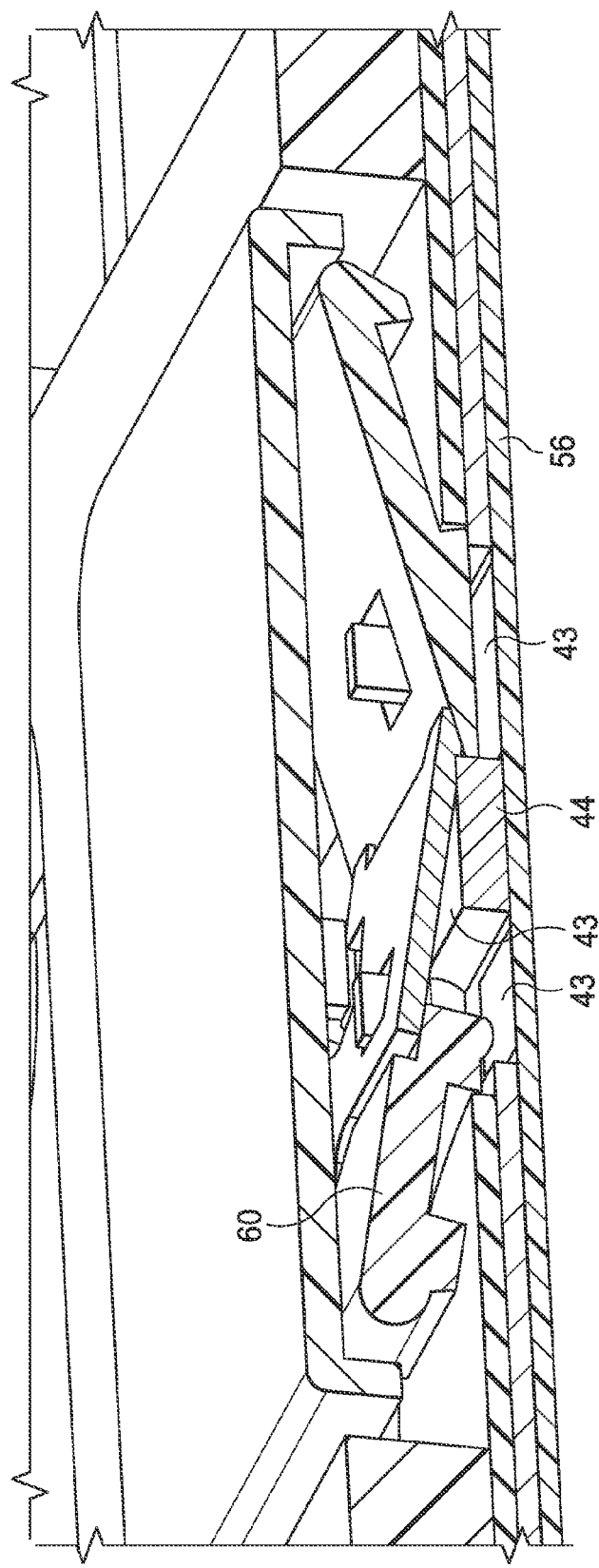
FIG. 8 depicts a side perspective view of an OLED film disposed on keyboard support that illuminates a key.

Referring now to FIG. 8, a side perspective view depicts an OLED film 43 disposed on keyboard support that illuminates a key. As illustrated by light path 64, illumination passes through clear arms 60 upwards to key cap 46. In the example embodiment of FIG. 8, OLED material is deposited on magnet 44 and passed through openings in the metal portion of lever structure 40. The placement of OLED films may vary based upon the available light paths to key cap 46, the ease of depositing the OLED film, and the availability of power for illumination of the OLED film.

Figure 9:
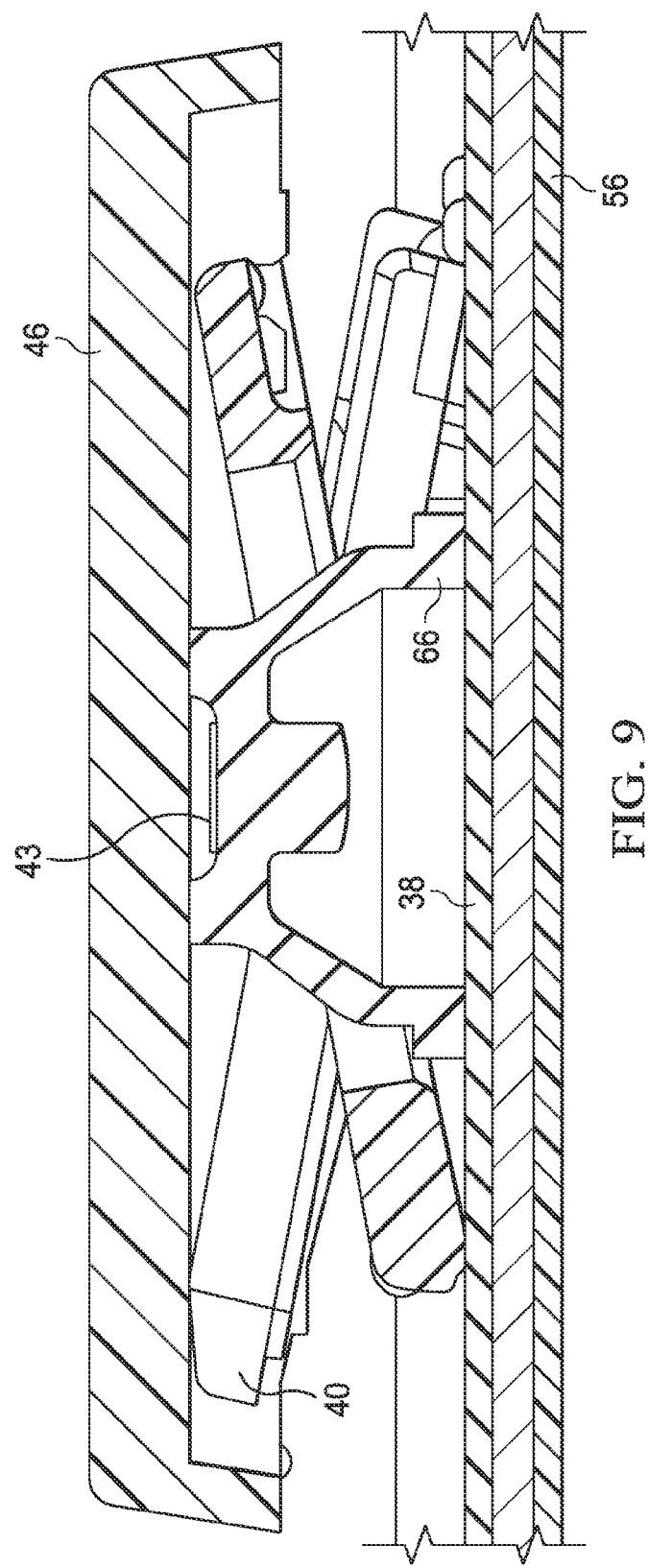
FIG. 9 depicts a side cutaway view of a keyboard having a rubber dome return device that integrates OLED key illumination.

Referring now to FIG. 9, a side cutaway view depicts a keyboard having a rubber dome 64 return device that integrates OLED 43 key illumination. Conventional keyboards dispose a rubber dome 66 within a lever structure 40 to bias key cap 46 upwards. Although the magnet based keyboards described above offer a lower Z height than is typically available in a rubber dome 66, rubber dome 66 tends to provide users with a more natural feedback of a key input. As is depicted in FIG. 9, rubber dome 66 has OLED films 43 integrated within it to provide illumination at key 46. For example, an OLED film and wire interface is injection molded within rubber dome 64 and interfaced with membrane 38 to obtain current for illumination. Alternatively, OLED film 43 is placed on top of the surface of rubber dome 66 with wirelines or other electrical contacts to a current source of membrane 38. In one embodiment, electrical contacts exposed in rubber dome 66 obtain current from electrical contacts exposed in membrane 38. Embedded OLED film 43 is placed in locations of rubber dome 66 that have reduced or minimal flexure, such as at the top portion that contacts cap 46 or the base that remains erect during key inputs. In alternative embodiments, OLED films 43 may be placed in other areas of the key structure as set forth above.

Although the present invention has been described in detail, it should be understood that various changes, substitutions and alterations can be made hereto without departing from the spirit and scope of the invention as defined by the appended claims.

What is claimed is:

1. A portable information handling system comprising:
  a housing;
  a processor disposed in the housing and operable to execute instructions to process information;
  a memory disposed in the housing and interfaced with the processor, the memory operable to store the information;
  a display disposed in the housing and interfaced with the processor and memory, the display operable to present the information as visual images;
  a keyboard interfaced with the processor, the keyboard having plural keys, each key operable to accept inputs from an end user and to communicate the inputs to the processor through a membrane, each of the plural keys having a cap configured to pass light and a lever structure configured to bias the cap away from the membrane, the lever structure having at least a portion configured to pass light, an organic light-emitting diode film disposed on the membrane below the portion to provide illumination through the portion and the cap, the lever structure having a magnet disposed beneath each cap; and
  an organic light-emitting diode (OLED) film deposited on the membrane in plural locations and selectively powered with current provided through the membrane to illuminate the plural keys.

2. The portable information handling system of claim 1 wherein the OLED film comprises a film located beneath each of the plural keys.

3. The portable information handling system of claim 1 wherein each of the plural keys comprises:
  a current path from the membrane at one or more of the plural keys, the current path configured to illuminate an OLED associated with the one or more of the plural keys.

4. The portable information handling system of claim 3 further comprising an OLED film disposed on the cap and powered through current path and lever structure to illuminate the cap.

5. A portable information handling system comprising:
  a housing;
  a processor disposed in the housing and operable to execute instructions to process information;
  a memory disposed in the housing and interfaced with the processor, the memory operable to store the information;
  a display disposed in the housing and interfaced with the processor and memory, the display operable to present the information as visual images;
  a keyboard interfaced with the processor, the keyboard having plural keys, each key operable to accept inputs from an end user and to communicate the inputs to the processor through a membrane, each of the plural keys having a cap, each cap having a character corresponding to the character input by an end user press of the key, a lever structure configured to bias the cap away from the membrane, and a current path from the membrane at one or more of the plural keys, the current path configured to illuminate an OLED associated with the one or more of the plural keys; and
  an organic light-emitting diode (OLED) film deposited on the membrane in plural locations and selectively powered with current provided through the membrane to illuminate the plural keys; and
  an OLED film disposed on the on the lever structure and powered through the current path to illuminate the cap.

6. A portable information handling system comprising:
  a housing;
  a processor disposed in the housing and operable to execute instructions to process information;
  a memory disposed in the housing and interfaced with the processor, the memory operable to store the information;
  a display disposed in the housing and interfaced with the processor and memory, the display operable to present the information as visual images;
  a keyboard interfaced with the processor, the keyboard having plural keys, each key operable to accept inputs from an end user and to communicate the inputs to the processor through a membrane; and
  an organic light-emitting diode (OLED) film deposited on the membrane in plural locations and selectively powered with current provided through the membrane to illuminate the plural keys; and
  a support structure disposed below the keyboard and having a magnet aligned with each key, the support structure having plural OLED films disposed in alignment with the magnets, the membrane having current connections aligned to power the OLED films disposed on the support structure.

7. A method for illuminating a keyboard, the method comprising:
  disposing an OLED film below each of plural keys of the keyboard; and
  selectively illuminating the OLED film with current passed through a membrane of the keyboard, the membrane operable to pass key inputs to an information handling system;
  wherein disposing an OLED film further comprises:
  disposing the OLED film on a lower surface of each of the plural keyboard key caps;
  providing power traces exposed on the membrane to provide power to each OLED key cap; and
  communicating power from the power traces to the OLED film through a lever structure of each of the plural keys.

8. The method of claim 7 wherein disposing an OLED film further comprises:
  disposing the OLED film directly on the membrane; and
  providing power traces exposed on the membrane at opposing ends of the OLED film.

9. A method for illuminating a keyboard, the method comprising:
  disposing an OLED film below each of plural keys of the keyboard; and
  selectively illuminating the OLED film with current passed through a membrane of the keyboard, the membrane operable to pass key inputs to an information handling system;

wherein disposing an OLED film further comprises:
disposing the OLED film on an upper surface of a lever structure of each of the plural keys;
providing power traces exposed on the membrane to provide power to each OLED film of the lever structure; and
communicating power from the power traces to the OLED film through the lever structure.

10. A method for illuminating a keyboard, the method comprising:
disposing an OLED film below each of plural keys of the keyboard; and
selectively illuminating the OLED film with current passed through a membrane of the keyboard, the membrane operable to pass key inputs to an information handling system;
wherein disposing an OLED film further comprises:
disposing the OLED film on an upper surface of a magnet positioned beneath each key;
providing power traces exposed on the membrane to aligned to provide power to each OLED film through the magnet.

11. The method of claim 10 wherein the magnet rests below a lever configured to bias the key upwards, the lever having transparent material that passes OLED illumination through.

12. A keyboard comprising:
plural keys, each key associated with one or more input values;
a lever structure supporting each key between a raised position and a lowered position;
a membrane disposed beneath the lever structures, the membrane detecting a key lowered position as an input, the membrane providing a signal to a keyboard connector to indicate the input;
a support plate disposed beneath the membrane to support the plural keys, lever structures and membrane; and
one or more OLED films disposed proximate one or more of the plural keys and powered through the membrane to illuminate the one or more of the plural keys;
wherein the one or more OLED films are disposed on the lever structure.

13. The keyboard of claim 12 wherein the one or more OLED films are disposed on the membrane.

14. The keyboard of claim 12 wherein the one or more OLED films are disposed on the support plate.

15. A keyboard comprising:
plural keys, each key associated with one or more input values;
a lever structure supporting each key between a raised position and a lowered position;
a membrane disposed beneath the lever structures, the membrane detecting a key lowered position as an input, the membrane providing a signal to a keyboard connector to indicate the input;
a support plate disposed beneath the membrane to support the plural keys, lever structures and membrane; and
one or more OLED films disposed proximate one or more of the plural keys and powered through the membrane to illuminate the one or more of the plural keys;
wherein the one or more OLED films are disposed on a bottom surface of the keys.

16. A keyboard comprising:
plural keys, each key associated with one or more input values;
a lever structure supporting each key between a raised position and a lowered position;
a membrane disposed beneath the lever structures, the membrane detecting a key lowered position as an input, the membrane providing a signal to a keyboard connector to indicate the input;
a support plate disposed beneath the membrane to support the plural keys, lever structures and membrane; and
one or more OLED films disposed proximate one or more of the plural keys and powered through the membrane to illuminate the one or more of the plural keys;
one or more magnets disposed beneath one or more of the plural keys, the one or more OLED films disposed on the one or more magnets.

* * * * *